United States Patent
Buford et al.

(10) Patent No.: US 9,308,812 B2
(45) Date of Patent: Apr. 12, 2016

(54) RECHARGEABLE ENERGY STORAGE SYSTEM COOLING

(75) Inventors: Keith D. Buford, Southfield, MI (US);
Matthew Simonini, Greenville, SC (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 895 days.

(21) Appl. No.: 13/566,670

(22) Filed: Aug. 3, 2012

(65) Prior Publication Data

US 2014/0034287 A1 Feb. 6, 2014

(51) Int. Cl.
| | |
|---|---|
| H01M 2/00 | (2006.01) |
| B60K 11/02 | (2006.01) |
| B60K 11/06 | (2006.01) |
| H01M 10/625 | (2014.01) |
| H01M 10/63 | (2014.01) |
| H01M 10/637 | (2014.01) |
| H01M 10/633 | (2014.01) |
| H01M 10/613 | (2014.01) |

(52) U.S. Cl.
CPC .............. B60K 11/02 (2013.01); B60K 11/06 (2013.01); H01M 10/613 (2015.04); H01M 10/625 (2015.04); H01M 10/63 (2015.04); H01M 10/633 (2015.04); H01M 10/637 (2015.04); *H01M 2220/20* (2013.01)

(58) Field of Classification Search
CPC ..... B60K 11/02; B60K 11/06; H01M 10/613; H01M 10/625; H01M 10/63; H01M 10/633; H01M 10/637; H01M 2220/20
See application file for complete search history.

(56) References Cited

U.S. PATENT DOCUMENTS

2012/0082871 A1* 4/2012 Simonini et al. ............... 429/50

FOREIGN PATENT DOCUMENTS

CN 102442219 A 5/2012

OTHER PUBLICATIONS

State Intellectual Property Office of the People's Republic of China, Office Action in Chinese Patent Application No. 201310333197.6 mailed May 6, 2015.

* cited by examiner

*Primary Examiner* — Patrick Ryan
*Assistant Examiner* — Ben Lewis
(74) *Attorney, Agent, or Firm* — Ingrassia Fisher & Lorenz, P.C.

(57) ABSTRACT

Methods, systems, and vehicles provide for cooling of a vehicle rechargeable energy storage system (RESS). A control system is coupled to the RESS, and is configured to cool the RESS. The control system includes a passive cooling system for cooling the RESS, an active cooling system for cooling the RESS, and a controller. The controller is coupled to the passive cooling system and the active cooling system, and is configured to determine whether conditions are present for effective use of the passive cooling system, initiate cooling of the RESS using the passive cooling system if it is determined that the conditions are present for effective use of the passive cooling system, and initiate cooling of the RESS using the active cooling system if it is determined that the conditions are not present for effective use of the passive cooling system.

14 Claims, 4 Drawing Sheets

FIG. 4

RECHARGEABLE ENERGY STORAGE SYSTEM COOLING

TECHNICAL FIELD

The present disclosure generally relates to the field of vehicles and, more specifically, to methods and systems for cooling of rechargeable energy storage systems of vehicles.

BACKGROUND

Certain vehicles, particularly electric vehicles and hybrid electric vehicles, have rechargeable energy storage systems (RESS), such as batteries. It is generally desired to maintain a temperature of the RESS within certain limits. However, current techniques for RESS cooling may not always be optimal, for example in terms of optimal cooling and optimal use of energy resources.

Accordingly, it is desirable to provide improved methods for cooling of vehicle RESS. It is also desirable to provide improved systems for such cooling of vehicle RESS, and for vehicles that include such methods and systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for cooling a rechargeable energy storage system (RESS) of a vehicle. The method comprises the steps of determining whether conditions are present for effective use of a passive cooling system for the RESS, cooling the RESS using the passive cooling system if it is determined that the conditions are present for effective use of the passive cooling system, and cooling the RESS using an active cooling system if it is determined that the conditions are not present for effective use of the passive cooling system.

In accordance with another exemplary embodiment, a control system is provided for cooling a rechargeable energy storage system (RESS) of a vehicle. The control system comprises a passive cooling system for cooling the RESS, an active cooling system for cooling the RESS, and a controller. The controller is coupled to the passive cooling system and the active cooling system, and is configured to determine whether conditions are present for effective use of the passive cooling system, initiate cooling of the RESS using the passive cooling system if it is determined that the conditions are present for effective use of the passive cooling system, and initiate cooling of the RESS using the active cooling system if it is determined that the conditions are not present for effective use of the passive cooling system.

In accordance with a further exemplary embodiment, a vehicle is provided. The vehicle comprises a drive system and a control system. The drive system includes a rechargeable energy storage system (RESS). The control system is coupled to the RESS, and is configured to cool the RESS. The control system comprises a passive cooling system for cooling the RESS, an active cooling system for cooling the RESS, and a controller. The controller is coupled to the passive cooling system and the active cooling system, and is configured to determine whether conditions are present for effective use of the passive cooling system, initiate cooling of the RESS using the passive cooling system if it is determined that the conditions are present for effective use of the passive cooling system, and initiate cooling of the RESS using the active cooling system if it is determined that the conditions are not present for effective use of the passive cooling system.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
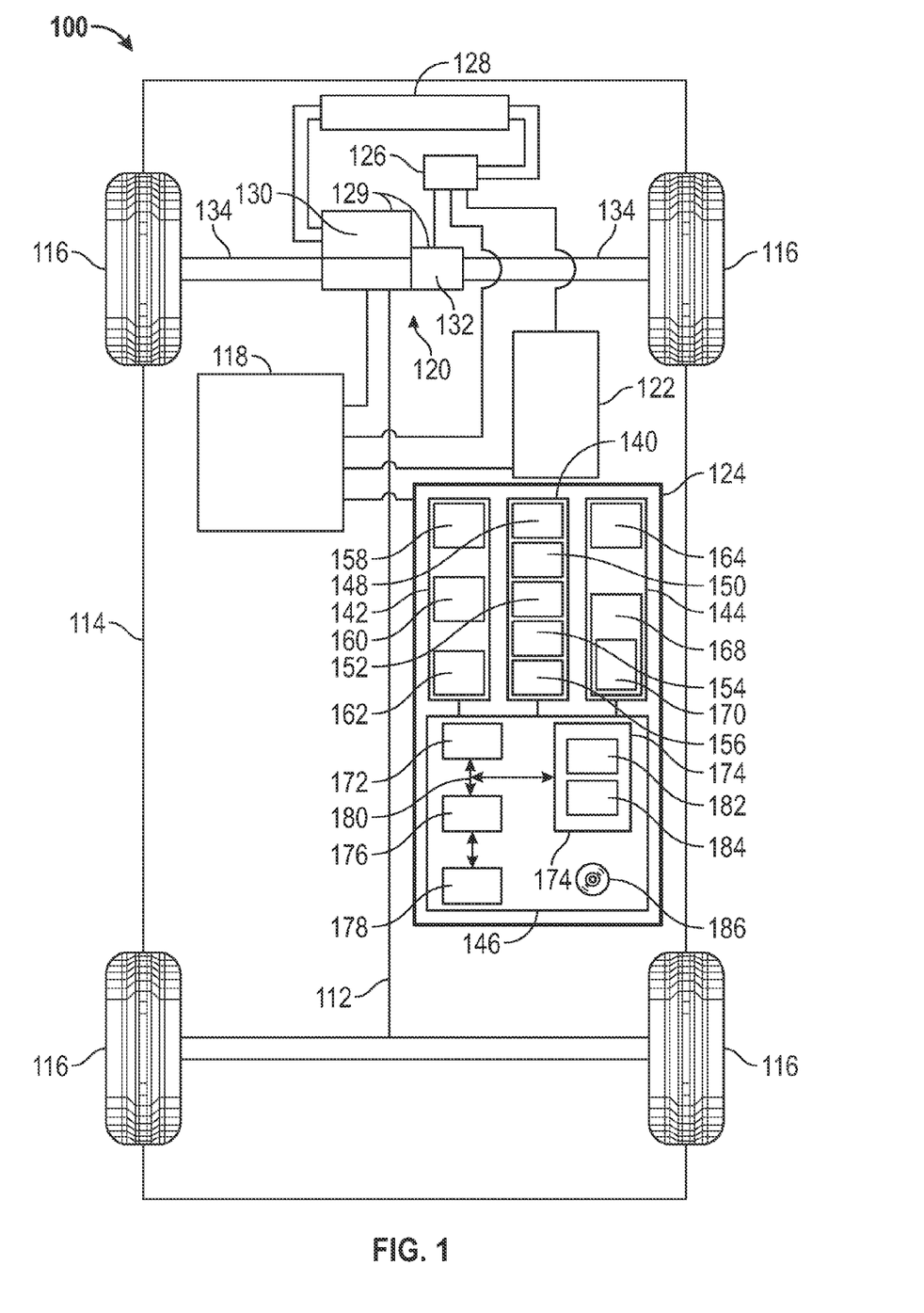
FIG. 1 is a functional block diagram of a vehicle that includes a rechargeable energy storage system (RESS) and a control system for cooling the RESS, in accordance with an exemplary embodiment.

FIG. 1 illustrates a vehicle 100, or automobile, according to an exemplary embodiment. As described in greater detail further below, the vehicle 100 is configured to cool a rechargeable energy storage system (RESS) of the vehicle 100 via a selective initiative of a passive cooling system and an active cooling system.

The vehicle 100 includes a chassis 112, a body 114, four wheels 116, and an electronic control system 118. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 120, the above-referenced RESS 122, an RESS control system 124, a power inverter assembly (or inverter) 126, and a radiator 128. The actuator assembly 120 includes at least one propulsion system 129 mounted on the chassis 112 that drives the wheels 116.

Specifically, as depicted in FIG. 1, the actuator assembly 120 includes a combustion engine 130 and an electric motor/ generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a coolant fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130. In certain other embodiments, the vehicle 100 may comprise a pure electric vehicle, without a combustion engine 130.

The RESS 122 is electrically connected to the inverter 126. In one embodiment, the RESS 122 is mounted on the chassis 112. In one such embodiment, the RESS 122 is disposed within a cockpit of the vehicle. In another embodiment, the RESS 122 is disposed underneath a cockpit of the vehicle. The RESS 122 preferably comprises a rechargeable battery having a pack of battery cells. In one embodiment, the RESS 122 comprises a lithium iron phosphate battery, such as a nanophosphate lithium ion battery. Together the RESS 122 and the propulsion system 129 provide a drive system to propel the vehicle 100. The RESS 122 is cooled by the RESS control system 124, as described in detail below.

As depicted in FIG. 1, the RESS control system 124 includes a sensor array 140, a passive cooling system 142, an active cooling system 144, and one or more controllers 146. The RESS control system 124 is coupled to, and at least facilitates control over, the RESS 122. Also as depicted in FIG. 1, the RESS control system 124 is preferably coupled to the radiator 128. In addition, although not illustrated as such, the RESS control system 124 (and/or one or more components thereof) may be integral with the electronic control system 118 and may also include one or more power sources. In certain embodiments, the controller(s) 146 may comprise multiple controllers and/or systems working together. For the sake of brevity, such controllers and/or systems are referenced collectively herein as the controller 146.

The sensor array 140 includes one or more ambient temperature sensors 148, RESS temperature sensors 150, coolant sensors 152, and wheel speed sensors 154. The ambient temperature sensors 148 are preferably disposed proximate but outside the RESS 122, and measure an ambient temperature outside (and preferably adjacent to) the RESS 122. The RESS temperature sensors 152 each measure a temperature of the RESS 122, most preferably each measuring a temperature of a different cell of the RESS 122. The coolant sensors 152 measure temperatures of coolant fluid used in the passive cooling system 142 and the active cooling system 144. The fan sensors 156 detect a setting of a fan (specifically, the fan 160, referenced below) of the passive cooling system 142, and also measure an actual front end speed of the fan. The various sensors of the sensor array 140 provide signals or other information regarding the measured values to the controller 146 for controlling cooling of the RESS 122 in accordance with steps of the process of FIG. 4 described further below.

The passive cooling system 142 includes a diverter 158, the above-referenced fan 160 and an air-to-liquid heat exchanger 162. While the RESS control system is using the passive cooling system 142 (based on instructions provided by the controller 146 in accordance with the steps of the process of FIG. 4, descried further below), outside ambient air is received from the radiator 128 and sent along the diverter 158, powered by the fan 160, to the air-to-liquid heat exchanger 162, thereby producing cooled coolant fluid that is used to cool the RESS 122. The passive cooling system 142 is initiated and controlled via instructions provided by the controller 146, preferably by a processor 172 thereof.

The active cooling system 144 includes a pump 164 and a liquid-to-liquid heat exchanger 168 that includes an alternating current (AC) compressor 170. While the RESS control system is using the active cooling system 144 (based on instructions provided by the controller 146 in accordance with the steps of the process of FIG. 4, descried further below), coolant fluid is circulated by the pump 164 to the heat exchanger 168 (specifically, including the compressor 170 thereof), thereby producing cooled coolant fluid that is used to cool the RESS 122. The active cooling system 144 is initiated and controlled via instructions provided by the controller 146, preferably by a processor 172 thereof.

As depicted in FIG. 1, the controller 146 comprises a computer system. In certain embodiments, the controller 146 may also include one or more of the sensors of the sensor array 140, the electronic control system 118 and/or portions thereof, and/or one or more other devices. In addition, it will be appreciated that the controller 146 may otherwise differ from the embodiment depicted in FIG. 1. For example, the controller 146 may be coupled to or may otherwise utilize one or more remote computer systems and/or other control systems.

In the depicted embodiment, the computer system of the controller 146 comprises a computer system that includes a processor 172, a memory 174, an interface 176, a storage device 178, and a bus 180. The processor 172 performs the computation and control functions of the controller 146, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 146 and the computer system of the controller 146, preferably in executing the steps of the processes described herein, such as the steps of the process 400 described further below in connection with FIG. 4.

The memory 174 can be any type of suitable memory. This would include the various types of dynamic random access memory (DRAM) such as SDRAM, the various types of static RAM (SRAM), and the various types of non-volatile memory (PROM, EPROM, and flash). The bus 180 serves to transmit programs, data, status and other information or signals between the various components of the computer system of the controller 146. In a preferred embodiment, the memory 174 stores the above-referenced program 182 along with one or more stored values 184 for use in cooling of the RESS 122. In certain examples, the memory 174 is located on and/or co-located on the same computer chip as the processor 172.

The interface 176 allows communication to the computer system of the controller 146, for example from a system driver and/or another computer system, and can be implemented using any suitable method and apparatus. It can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 400 of FIG. 4, described further below. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium storing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 146 may also otherwise differ from the embodiment depicted in FIG. 1, for example in that the computer system of the controller 146 may be coupled to or may otherwise utilize one or more remote computer systems and/or other control systems.

The radiator 128 is connected to the frame at an outer portion thereof and although not illustrated in detail, includes multiple cooling channels therein that contain a coolant fluid (i.e., coolant) such as water and/or ethylene glycol (i.e., "antifreeze") and is coupled to the combustion engine 130 and the inverter 126. In addition, as mentioned above, the radiator 128 supplies ambient air for use by the passive cooling system 142 for cooling the RESS 122.

Figure 2:
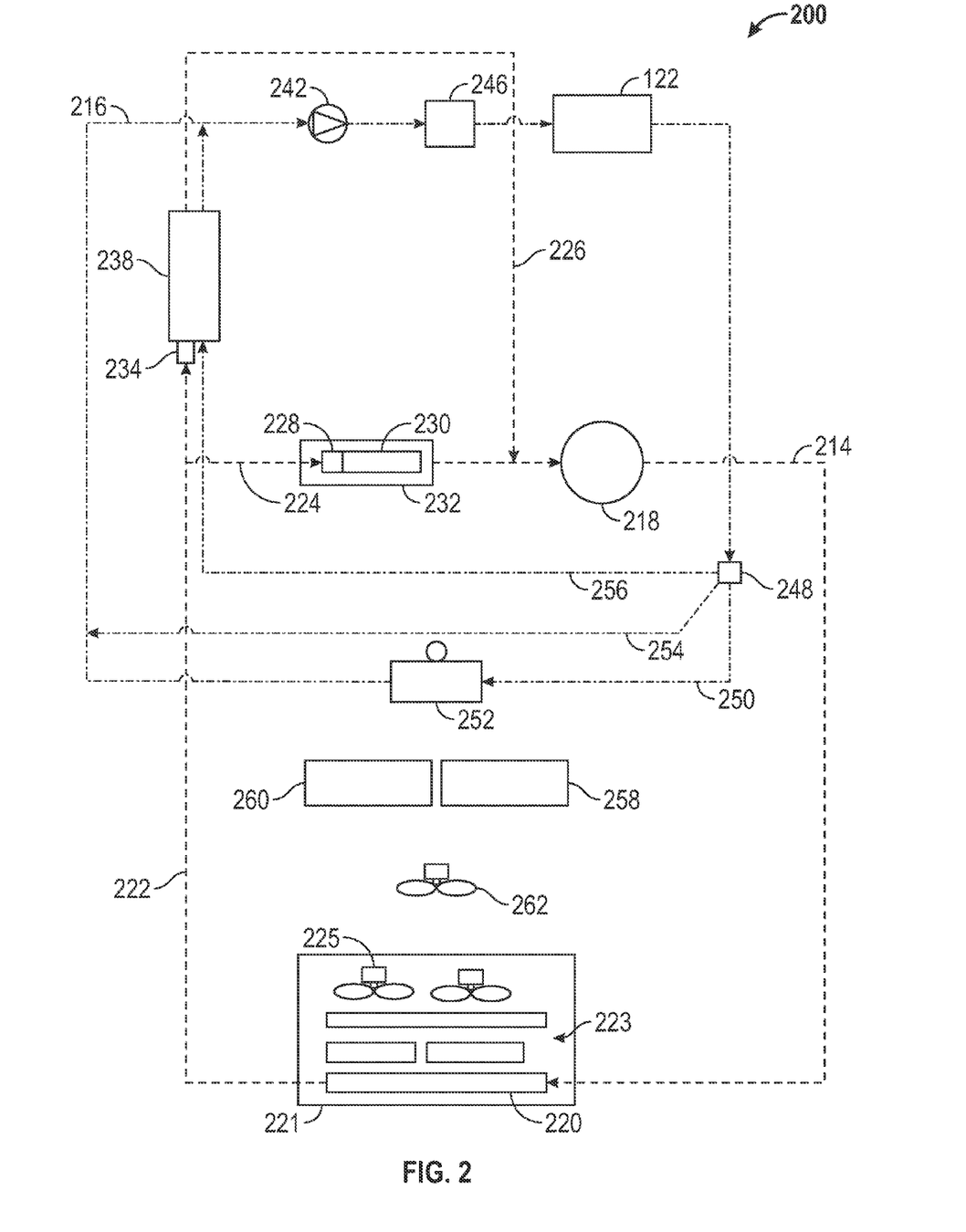
FIG. 2 is a schematic view of a cooling system of the control system of FIG. 1, in accordance with an exemplary embodiment.

With reference to FIG. 2, a schematic view is provided of a cooling system 200 for use in cooling an RESS of a vehicle, such as the RESS 122 of the vehicle 100 of FIG. 1, in accordance with a first exemplary embodiment. The cooling system 200 is a combined cooling system that includes both the passive cooling system 142 and the active cooling system 144 of FIG. 1, in accordance with a preferred embodiment. The embodiment of the cooling system 200 depicted in FIG. 2 may be used, for example, in a plug-in hybrid electric vehicle or an extended range electric vehicle. Each of the components of the cooling system 200 are preferably controlled directly or indirectly via instructions provided by the controller 146 of FIG. 1, most preferably by the processor 172 thereof.

As depicted in FIG. 2, the cooling system 200 includes a refrigerant loop 214 and a coolant loop 216, both preferably corresponding to the active cooling system 144 of FIG. 1. The refrigerant loop 214 includes a refrigerant compressor 218 (preferably corresponding to the compressor 170 of FIG. 1) and a condenser 220. In certain examples, the refrigerant loop 214 and the refrigerant compressor 218 may be part of a condenser, radiator, fan module (CRFM) 221. The CRFM 221 may include other heat exchangers 223 and fans 225 used to heat or cool fluids from other vehicle systems as well as from the RESS 122 of FIG. 1. In a preferred embodiment, the refrigerant compressor 218 is electrically driven, and is capable of adjusting the speed of the compressor during operation.

The condenser 220 directs refrigerant into a refrigerant line 222 that splits into a heat, ventilation, and air cooling (HVAC) leg 224 and a chiller leg 226 of the refrigerant loop 214. The HVAC leg 224 directs the refrigerant through an expansion device 228 and into an evaporator 230, which is located in an HVAC module 232. In some embodiments, refrigerant exiting the evaporator 230 may be directed back to the refrigerant compressor 218 through an accumulator (not shown).

The chiller leg 226 directs the refrigerant through an expansion device 234 and then through a chiller 238. The chiller 238 preferably comprises a refrigerant-to-coolant heat exchanger. Refrigerant exiting the chiller 238 is directed back to the refrigerant compressor 218 via chiller leg 226.

The chiller 238 is also in fluid communication with the coolant loop 216. The dashed lines in FIG. 2 (and, similarly, in FIG. 3, described further below) represent lines through which refrigerant flows. The dash-dot lines represent lines through which a coolant liquid flows. The coolant liquid may be a conventional liquid mixture such as an ethylene glycol and water mix, or may be some other type of liquid with suitable heat transfer characteristics.

As depicted in FIG. 2, the coolant loop 216 includes a coolant pump 242 (preferably, corresponding to the pump 164 of FIG. 1) that pumps the coolant through the coolant loop 216. The coolant pump 242 is controllable to vary the flow rate of the coolant flowing through the coolant loop 216. The coolant loop 216 also includes the RESS 122 of FIG. 1, and an electric coolant heater 246. The coolant flowing through the RESS 122 is used to cool or warm the RESS as needed. The electric coolant heater 246 can be activated to heat the coolant flowing through it in order to provide warming to the RESS 122.

A four port coolant routing valve 248 is located in the coolant loop 216. The routing valve 248 can be selectively actuated to direct the coolant through three different branches of the coolant loop 216. A first branch 250 includes an RESS radiator 252 (preferably, corresponding to the radiator 128 of FIG. 1), which is positioned to have air flowing through it (preferably, corresponding to the passive cooling system 142 of FIG. 1). The RESS radiator 252 may be mounted near an accessory power module 258 and an RESS charger 260, which have air directed through them by a controllable fan 262 (preferably, corresponding to the fan 160 of FIG. 1). A second branch 254 forms a coolant bypass line where the coolant does not flow through the RESS radiator 252 or the chiller 238. A third branch 256 directs the coolant through the chiller 238. All three branches join together to direct the coolant back through the RESS 122.

Figure 3:
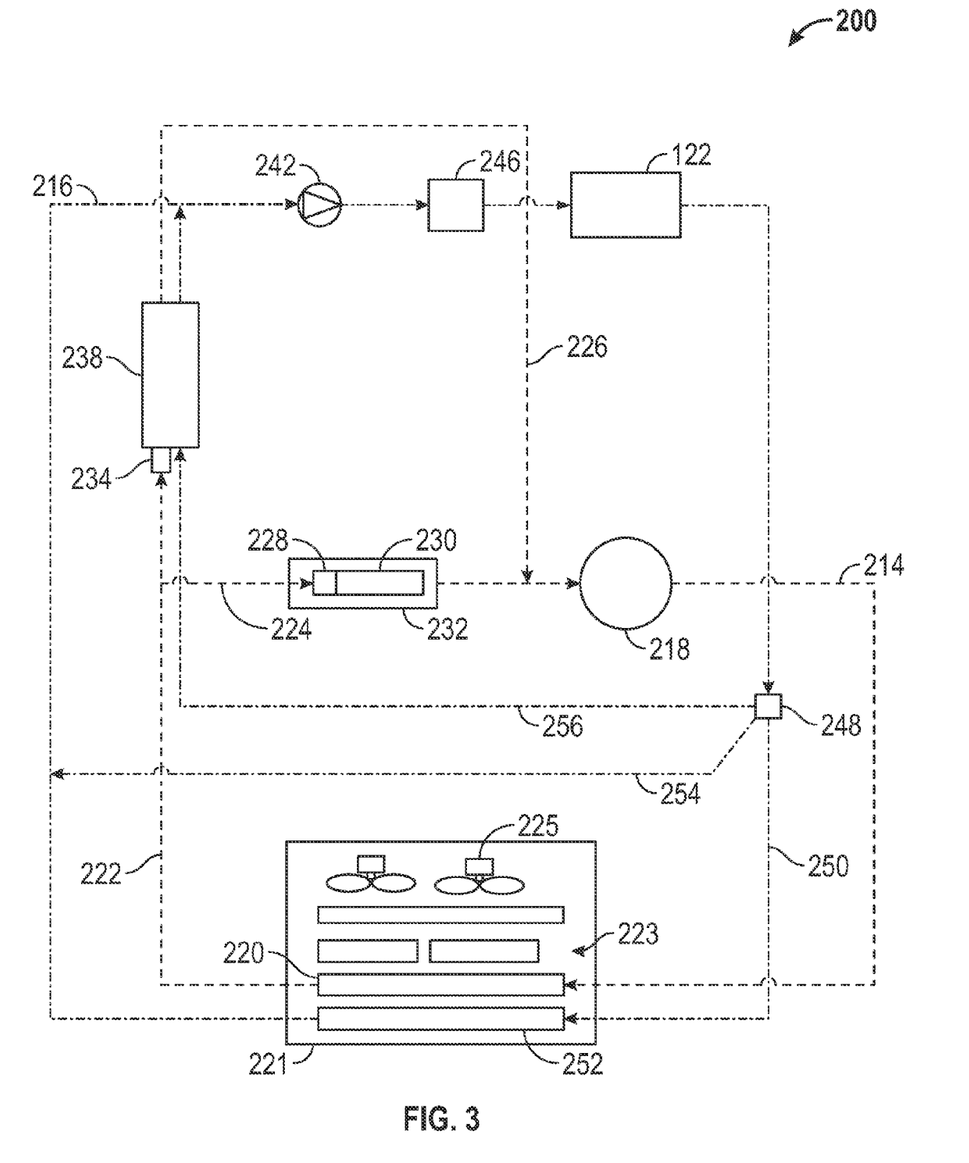
FIG. 3 is a schematic view of a cooling system of the control system of FIG. 1, in accordance with an alternate exemplary embodiment.

FIG. 3 illustrates another example of the cooling system 200, in accordance with a second exemplary embodiment. The embodiment of FIG. 3 may be used, for example, in connection with an extended range electric vehicle. Because the embodiment of FIG. 3 is similar to that of FIG. 2, similar element numbers will be used for similar elements, which also have similar functions as those described above in connection with FIG. 2. In the embodiment of FIG. 3, the RESS radiator 252 may be part of the CRFM 221. While the two embodiments of FIGS. 2 and 3 may have somewhat different configurations, the processes, discussed below, for cooling and warming the RESS 122 may be essentially the same, if so desired. Similar to the embodiment of FIG. 2, in FIG. 3 each of the components of the cooling system 200 are similarly preferably controlled directly or indirectly via instructions provided by the controller 146 of FIG. 1, most preferably by the processor 172 thereof.

Figure 4:
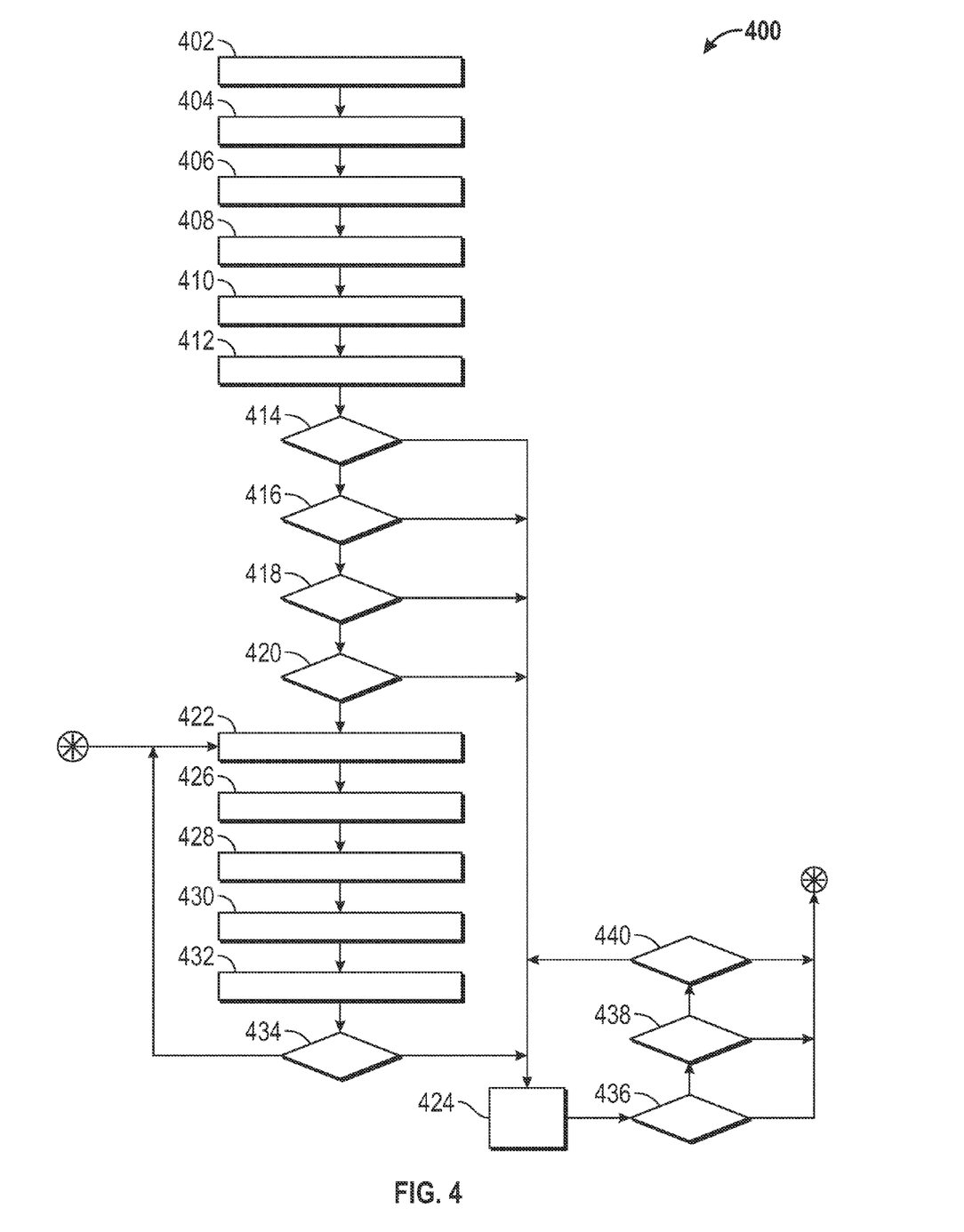
FIG. 4 is a flowchart of a process for cooling an RESS for a vehicle, and that can be used in connection with the vehicle, the RESS, and the control system of FIG. 1 (including the cooling systems of FIGS. 2 and 3), in accordance with an exemplary embodiment.

FIG. 4 is a flowchart of a process 400 for cooling an RESS for a vehicle, in accordance with an exemplary embodiment. The process 400 cools a rechargeable energy storage system (RESS) of a vehicle by selectively initiating a passive cooling system and an active cooling system for the RESS. The process 400 can be utilized in connection with the vehicle 100, the RESS 122, and the RESS control system 124 of FIG. 1, including the passive cooling system 142 and the active cooling system 144 of FIG. 1 (and including the combined implementation of the cooling system 200 embodiments of FIGS. 2 and 3) and the controller 146 of FIG. 1, in accordance with a preferred embodiment. Each of the steps of the process 400 is preferably performed repeatedly, and preferably continuously, throughout a current vehicle drive (or current ignition cycle of the vehicle).

An ambient temperature is obtained (step 402). The ambient temperature preferably comprises a temperature outside and adjacent to the RESS 122 of FIG. 1. The ambient temperature is preferably measured by one or more ambient temperature sensors 148 of FIG. 1 and provided to the controller 146 of FIG. 1, and most preferably to the processor 172 thereof, for processing.

RESS temperatures are obtained (step 404). Preferably, the RESS temperatures are obtained from various cells of the RESS 122 of FIG. 1 by the RESS temperature sensors 150 of FIG. 1 and provided to the controller 146 of FIG. 1, and most preferably to the processor 172 thereof, which calculates an average cell temperature for the RESS 122 by averaging the various cell temperature values. As used throughout this application, the RESS temperature preferably comprises a temperature within the RESS 122 of FIG. 1, and most preferably an average RESS cell temperature value, such as described directly above.

A temperature difference is calculated (step 406). The temperature difference comprises a difference between the RESS temperature of step 404 and the ambient temperature of step 402. The temperature difference is preferably calculated by the processor 172 of FIG. 1 by subtracting the ambient temperature of step 402 from the average RESS cell temperature of step 404.

A vehicle speed is determined (step 408). In one embodiment, the vehicle speed is calculated by the processor 172 of FIG. 1 based on wheel speed values obtained from the wheel speed sensors 154 of FIG. 1. In certain other embodiments, the vehicle speed may be determined via a different technique, such as from an accelerometer or a global positioning system (GPS) (not depicted).

A fan setting is determined (step 410). The fan setting preferably corresponds to a setting of the fan 160 of the passive cooling system 142 of FIG. 1. For example, the fan setting may correspond to a number of revolutions per minute, or to one of a group of discrete fan sections (such as low, medium, or high). The fan setting is preferably determined by the processor 172 of FIG. 1 based on information obtained from the fan sensors 156 of FIG. 1.

A flow rate is determined for air flowing through the passive cooling system (step 412). The flow rate preferably comprises a rate of flow (e.g., volume over time) of ambient air flowing from outside the vehicle 100 of FIG. 1 through the radiator 128 of FIG. 1 to the passive cooling system 142. The flow rate is preferably determined by the processor 172 of FIG. 1 using the vehicle speed of step 408 and/or the fan setting of step 410. In one such embodiment, the processor 172 uses a look-up table stored as one of the stored values 184 in the memory 174 of FIG. 1 that includes known flow rates of air for given fan settings and/or vehicle speeds.

A determination is made as to whether the ambient temperature of step 402 is less than a first predetermined threshold (step 414). The first predetermined threshold is preferably stored as one of the stored values 184 of the memory 174 of FIG. 1. In one embodiment, the first predetermined threshold is equal to thirty two degrees Celsius. This determination is preferably made by the processor 172 of FIG. 1.

If it is determined that the ambient temperature is less than the first predetermined threshold, then a determination is made as to whether the RESS temperature of step 404 (preferably, an average temperature of the cells of the RESS) is less than a second predetermined threshold (step 416). The second predetermined threshold is preferably stored as one of the stored values 184 of the memory 174 of FIG. 1. In one embodiment, the second predetermined threshold is equal to thirty two degrees Celsius. In certain embodiments, the first predetermined threshold of step 402 and the second predetermined threshold of step 404 may differ from thirty two degrees Celsius, and/or may differ from one another. The determination of step 416 is preferably made by the processor 172 of FIG. 1.

If it is determined that the RESS temperature is less than the second predetermined threshold, then a determination is made as to whether the temperature difference of step 406 is greater than a third predetermined threshold (step 418). Specifically, during step 418, a determination is preferably made as to whether the ambient temperature is less than the average RESS cell temperature by more than "X" degrees, in which "X" represents the third predetermined threshold. In one exemplary embodiment, the third predetermined threshold is equal to two degrees Celsius. In another exemplary embodiment, the third predetermined threshold is equal to one and one half degrees Celsius. The determination of step 418 is preferably made by the processor 172 of FIG. 1, and the third predetermined threshold is preferably stored as one of the stored values 184 of the memory 174 of FIG. 1.

If it is determined that the temperature difference is greater than the third predetermined threshold, then a determination is made as to whether the flow rate of step 412 is greater than a fourth predetermined threshold (step 420). The fourth predetermined threshold is preferably stored as one of the stored values 184 of the memory 174 of FIG. 1. In one embodiment, the fourth predetermined threshold is equal to thirty cubic meters per minute. The determination of step 420 is preferably made by the processor 172 of FIG. 1.

If it is determined that the flow rate is greater than the fourth predetermined threshold, then the RESS is cooled by initiating the passive cooling system (step 422). Specifically, the passive cooling system is initiated (for example, by initiating operation of the fan and heat exchanger of the passive cooling system based on instructions provided by the processor) if each of the following criteria are satisfied, namely: (i) the ambient temperature of step 402 is less than the first predetermined threshold of step 414, (ii) the RESS temperature of step 404 is less than the second predetermined threshold of step 416, (iii) the temperature difference of step 406 is greater than the third predetermined threshold of step 418, and (iv) the flow rate of step 412 is greater than the fourth predetermined threshold of step 420. If all of these criteria are satisfied, then the passive cooling system 142 of FIG. 1 (including the air to liquid heat exchanger 162 of FIG. 1) are initiated via instructions provided by the processor 172 of FIG. 1. The passive cooling system is implemented under these conditions because it is determined that the passive cooling system (which requires less energy than the active cooling system) may be able to effectively cool the RESS to a desired temperature level. During step 422, the active cooling system is turned off while the passive cooling system is operating (as controlled by the processor of the control system).

Conversely, if any of the conditions of steps 414, 416, 418, or 420 are not satisfied, then the process proceeds instead to step 424, in which the active cooling system is instead initiated (for example, by initiating operation of the pump, compressor, and heat exchanger of the active cooling system based on instructions provided by the processor). Specifically, the process proceeds to step 424 if any of the following criteria are satisfied, namely: (i) the ambient temperature of step 402 is greater than or equal to the first predetermined threshold of step 414, (ii) the RESS temperature of step 404 is greater than or equal to the second predetermined threshold of step 416, (iii) the temperature difference of step 406 is less than or equal to the third predetermined threshold of step 418, or (iv) the flow rate of step 412 is less than or equal to the fourth predetermined threshold of step 420. If any of these criteria for step 424 are satisfied, then the active cooling system 144 (including the liquid to liquid heat exchanger 168 of FIG. 1 and the compressor 170 of FIG. 1) are initiated via instructions provided by the processor 172 of FIG. 1. The active cooling system is implemented under these conditions because it is determined that the passive cooling system is unlikely, under these conditions, to be able to effectively cool the RESS to a desired temperature level.

Returning to step 422, once the passive cooling system is initiated, a timer is started (step 426). In one embodiment, the timer runs for two hundred seconds at a time, although this may vary in other embodiments. The timer is preferably operated via instructions provided by the processor 172 of FIG. 1.

Once the timer is completed (for example, in one exemplary embodiment, after a time period of approximately two hundred seconds), an entry temperature is obtained for the RESS during operation of the passive cooling system (step 428). The entry temperature comprises a temperature of coolant fluid entering the RESS 122 of FIG. 1. The entry temperature is preferably measured by the coolant sensors 152 of FIG. 1, and signals or information pertaining thereto are provided by the coolant sensors 152 to the processor 172 of FIG. 1 for processing.

In addition, an exit temperature is obtained for the RESS during operation of the passive cooling system (step 430). The exit temperature comprises a temperature of coolant fluid exiting the RESS 122 of FIG. 1. The exit temperature is preferably measured by the coolant sensors 152 of FIG. 1, and signals or information pertaining thereto are provided by the coolant sensors 152 to the processor 172 of FIG. 1 for processing.

A measure of heat transfer is determined during operation of the passive cooling system (step 432). The heat transfer is preferably calculated based on the entry temperature of step 428 and the exit temperature of step 430. Specifically, in a preferred embodiment, the heat transfer is calculated by the processor 172 of FIG. 1 in accordance with the following equation:

$$q = m^* C^* (T_{out} - T_{in}) \quad \text{(Equation 1)},$$

in which "q" represents the calculated heat transfer, "C" represents the specific heat of the coolant, "m" represents the mass flow rate of the coolant, $T_{in}$ represents the entry temperature of step 428 (i.e., the temperature of the coolant fluid entering the RESS), and $T_{out}$ represents the exit temperature of step 430 (i.e., the temperature of the coolant fluid exiting the RESS). The mass flow rate of the coolant is preferably determined using a look-up table stored as one of the stored values 184 in the memory 174 of FIG. 1 that includes known coolant flow rates for given commanded duty cycles of the coolant pump and the current temperature of the coolant. Alternatively, in certain embodiments a flow meter may be used to directly determine the mass flow rate. The specific heat of the coolant is preferably retrieved from the stored values 184 of the memory 174 of FIG. 1.

A determination is made as to whether the measure of heat transfer from step 432 is greater than a predetermined heat threshold (step 434). This determination is preferably made by the processor 172 of FIG. 1. In one exemplary embodiment, the predetermined heat threshold is equal to three hundred watts. The predetermined heat threshold is preferably stored as one of the stored values 184 of the memory 174 of FIG. 1.

If it is determined that the measure of heat transfer is greater than the predetermined heat threshold, then the passive cooling system is deemed to be effective at cooling the RESS. Accordingly, the process returns to step 422, and the passive cooling system continues to be used to cool the RESS (and the active cooling system continues to be turned off). Steps 422-434 continue to repeat (for example, in one embodiment, every two hundred seconds, using updated input values, such as for the temperature values and the mass flow rate) until there is a determination in a subsequent iteration of step 434 that the measure of heat transfer is less than or equal to the predetermined heat threshold. Once it is determined in an iteration of step 434 that the measure of heat transfer is less than or equal to the predetermined threshold, then the passive cooling system is deemed to be no longer effective at cooling the RESS, and the process proceeds accordingly to the above-referenced step 424, in which the active cooling system is initiated for cooling the RESS. Preferably, during step 424, the passive cooling is not operating (and is turned off by the processor if it has previously been operating), so that the active cooling system is operating alone to cool the RESS (by comparison, during step 424, the passive cooling system is operating alone to cool the RESS).

With reference to step 424, while the active cooling system is operating, a determination is made as to whether the active cooling event has been completed (step 436). This determination is preferably made by the processor 172 of FIG. 1. In one embodiment, step 424 comprises a determination as to when active cooling has been completed by looking at the average RESS temperature compared to a predetermine threshold. In one such example, the active cooling algorithm may typically increase the RESS temperature from 32 degrees Celsius to 27 degrees Celsius. In various embodiments, these temperatures may vary. In this example, after the RESS temperature reaches 27 degrees Celsius, active cooling terminates. Once active cooling terminates, passive cooling conditions can be reevaluated, but preferably not before active cooling has terminated (for example, to avoid interrupting active cooling to re-try passive cooling).

If it is determined that the active cooling event has been completed, then the active cooling system is turned off. Specifically, when the active cooling event has been completed, the process proceeds to the above-referenced step 422, as the active cooling is terminated, and passive cooling is initiated to cool the RESS (preferably via instructions provided by the processor 172 of FIG. 1 to the respective cooling systems).

Conversely, if it is determined that the active cooling event has not been completed, then a determination is made as to whether the vehicle speed of step 408 has been greater than a predetermined speed threshold for at least a predetermined amount of time (step 438). The speed and time thresholds of step 438 are preferably stored as stored values 184 of the memory 174 of FIG. 1. The determinations of step 438 are preferably made by the processor 172 of FIG. 1. In one embodiment, the vehicle speed threshold is a speed threshold that corresponds to a resulting front end airflow of at least thirty cubic feet per minute, or enough to allow time to move any stagnant fluid (air and liquid) from the vicinity of the front end system (typically twenty to thirty seconds) to filter out any stop and go traffic events. In one such embodiment, the vehicle speed threshold is approximately equal to twenty kilometers per hour (20 kph) and the time threshold is approximately equal to twenty seconds (20 sec).

If it is determined that the vehicle speed of step 408 has been greater than the predetermined speed threshold for at least the predetermined amount of time, then the process proceeds to the above-referenced step 422, as active cooling is terminated, and passive cooling is initiated to cool the RESS (preferably via instructions provided by the processor 172 of FIG. 1 to the respective cooling systems).

Conversely, if it is determined that the vehicle speed of step 408 has not been greater than the predetermined speed threshold for at least the predetermined amount of time, then a determination is made whether a front end fan speed has exceeded a commanded speed for at least a predetermined amount of time (step 440). This determination is preferably made by the processor 172 of FIG. 1 based on measurements made by the fan sensors 156 with respect to a setting (or set speed) and the actual speed of the fan 160 of FIG. 1. The predetermined thresholds of step 408 are preferably stored as one of the stored values 184 of the memory 174 of FIG. 1. In one embodiment, the predetermine thresholds correspond to whether the fan speed is equal to at least approximately thirty percent (30%) of the duty cycle commanded speed for at least twenty seconds (20 sec).

If it is determined that the front end fan speed has exceeded the commanded speed for at least the predetermined amount of time, then the process proceeds to the above-referenced step 422, as active cooling is terminated, and passive cooling is initiated to cool the RESS (preferably via instructions provided by the processor 172 of FIG. 1 to the respective cooling systems). Conversely, if it is determined that the front end fan speed has not exceeded the commanded speed for at least the predetermined amount of time, then the process instead proceeds to step 424, as the active cooling system continues to be used to cool the RESS.

Accordingly, the disclosed methods, systems, and vehicles provide for potentially more efficient cooling of rechargeable energy storage systems (RESS) of vehicles. A passive cooling system with an air to liquid heat exchanger is initiated, thereby conserving energy, when situations indicate that the passive cooling system is likely to operate correctly, provided that sufficient heat transfer is occurring via the passive cooling system for effectively cooling the RESS. When conditions are not present for effective operation of the passive cooling system, or when the passive cooling system is not yielding sufficient heat transfer, the active cooling system is instead utilized to cool the RESS.

It will be appreciated that the disclosed methods, systems, and vehicles may vary from those depicted in the Figures and described herein. For example, the vehicle 100, the RESS control system 124, the cooling systems 142, 144, 200, and/or various components thereof may vary from that depicted in FIGS. 1-3 and described in connection therewith. In addition, it will be appreciated that certain steps of the process 400 may vary from those depicted in FIG. 4 and/or described above in connection therewith. It will similarly be appreciated that certain steps of the process described above may occur simultaneously or in a different order than that depicted in FIG. 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for cooling a rechargeable energy storage system (RESS) of a vehicle, the method comprising:
   determining whether conditions are present for effective use of a passive cooling system for the RESS, wherein the passive cooling system comprises a fan;
   cooling the RESS using the passive cooling system if it is determined that the conditions are present for effective use of the passive cooling system;
   cooling the RESS using an active cooling system if it is determined that the conditions are not present for effective use of the passive cooling system; and
   re-initiating the passive cooling system if a vehicle speed exceeds a first predetermined value for a first predetermined amount time, a commanded fan speed exceeds a second predetermined value for a second predetermined amount of time, or both.

2. The method of claim 1, wherein:
   the step of cooling the RESS using the passive cooling system comprises cooling the RESS using an air-to-liquid heat exchanger if it is determined that the conditions are present for effective use of the passive cooling system; and
   the step of cooling the RESS using the active cooling system comprises cooling the RESS using a liquid-to-liquid heat exchanger if it is determined that the conditions are not present for effective use of the passive cooling system.

3. The method of claim 1, wherein:
   the step of determining whether conditions are present for effective use of the passive cooling system for the RESS comprises determining whether conditions are present for effective use of the passive cooling system based on a temperature of the RESS, an ambient temperature proximate the vehicle, or both.

4. The method of claim 1, wherein:
   the vehicle includes a radiator; and
   the step of determining whether conditions are present for effective use of the passive cooling system for the RESS comprises determining whether conditions are present for effective use of the passive cooling system based also on an estimated flow of air through the radiator.

5. The method of claim 1, further comprising:
determining a measure of heat transfer during operation of the passive cooling system; and
initiating the active cooling system if the measure of heat transfer is less than a predetermined threshold.

6. The method of claim 5, wherein the step of determining the measure of heat transfer comprises:
measuring a first temperature of coolant fluid entering the RESS during operation of the passive cooling system;
measuring a second temperature of coolant fluid exiting the RESS during operation of the passive cooling system; and
calculating the measure of heat transfer using the first temperature, the second temperature, and a flow rate of the coolant fluid.

7. A control system for cooling a rechargeable energy storage system (RESS) of a vehicle, the control system comprising:
a passive cooling system for cooling the RESS;
an active cooling system for cooling the RESS; and
a controller coupled to the passive cooling system and the active cooling system, the controller comprising:
a plurality of sensors configured to:
measure a first temperature of coolant fluid entering the RESS during operation of the passive cooling system; and
measure a second temperature of coolant fluid exiting the RESS during operation of the passive cooling system; and
a processor coupled to the plurality of sensors and configured to:
determine a flow rate of the coolant fluid during operation of the passive cooling system;
calculate a measure of heat transfer using the first temperature, the second temperature, and the flow rate;
initiate cooling of the RESS using the passive cooling system if the measure of heat transfer is greater than a predetermined threshold; and
initiate cooling of the RESS using the active cooling system if the measure of heat transfer is less than the predetermined threshold.

8. The control system of claim 7, wherein:
the passive cooling system uses an air-to-liquid heat exchanger; and
the active cooling system uses a liquid-to-liquid heat exchanger.

9. The control system of claim 7, wherein:
the plurality of sensors include a sensor unit configured to measure an ambient temperature proximate the vehicle, a temperature of the RESS, or both; and
the processor is coupled to the sensor unit and configured to:
determine whether conditions are present for effective use of the passive cooling system based on the ambient temperature, the temperature of the RESS, or both;
initiate cooling of the RESS using the passive cooling system if it is determined that the conditions are present for effective use of the passive cooling system; and
initiate cooling of the RESS using the active cooling system if it is determined that the conditions are not present for effective use of the passive cooling system.

10. The control system of claim 7, wherein:
the vehicle includes a radiator; and
the processor is configured to:
determine whether conditions are present for effective use of the passive cooling system based on a mass flow rate of air through the radiator;
initiate cooling of the RESS using the passive cooling system if it is determined that the conditions are present for effective use of the passive cooling system; and
initiate cooling of the RESS using the active cooling system if it is determined that the conditions are not present for effective use of the passive cooling system.

11. The control system of claim 7, wherein:
the passive cooling system comprises a fan; and
the controller is further configured to re-initiate the passive cooling system if a vehicle speed exceeds a first predetermined value for a first predetermined amount time, a commanded fan speed exceeds a second predetermined value for a second predetermined amount of time, or both.

12. A method for cooling a rechargeable energy storage system (RESS) of a vehicle, the method comprising:
measuring a first temperature of coolant fluid entering the RESS during operation of a passive cooling system for the RESS;
measuring a second temperature of coolant fluid exiting the RESS during operation of the passive cooling system;
calculating a measure of heat transfer using the first temperature, the second temperature, and a flow rate of the coolant fluid;
initiate cooling of the RESS using the passive cooling system if the measure of heat transfer is greater than the predetermined threshold; and
initiate cooling of the RESS using an active cooling system if the measure of heat transfer is less than the predetermined threshold.

13. The method of claim 12, wherein:
the step of cooling the RESS using the passive cooling system comprises cooling the RESS using an air-to-liquid heat exchanger if the measure of heat transfer is greater than the predetermined threshold; and
the step of cooling the RESS using the active cooling system comprises cooling the RESS using a liquid-to-liquid heat exchanger if the measure of heat transfer is less than the predetermined threshold.

14. The method of claim 12, wherein the passive cooling system comprises a fan, and the method further comprises:
re-initiating the passive cooling system if a vehicle speed exceeds a first predetermined value for a first predetermined amount time, a commanded fan speed exceeds a second predetermined value for a second predetermined amount of time, or both.

* * * * *